US012600268B2

(12) United States Patent
Kaemmerer et al.

(10) Patent No.: US 12,600,268 B2
(45) Date of Patent: Apr. 14, 2026

(54) VEHICLE SEAT

(71) Applicant: ADIENT US LLC, Plymouth, MI (US)

(72) Inventors: Joachim Kaemmerer, Kaiserslautern
(DE); Ralph Recktenwald, Freisen
(DE); Holger Kunz, Otterberg (DE)

(73) Assignee: Adient US LLC, Plymouth, MI (US)

( * ) Notice: Subject to any disclaimer, the term of this
patent is extended or adjusted under 35
U.S.C. 154(b) by 334 days.

(21) Appl. No.: 18/250,997

(22) PCT Filed: Oct. 28, 2021

(86) PCT No.: PCT/IB2021/059964
§ 371 (c)(1),
(2) Date: Apr. 28, 2023

(87) PCT Pub. No.: WO2022/090984
PCT Pub. Date: May 5, 2022

(65) Prior Publication Data
US 2023/0382273 A1 Nov. 30, 2023

(30) Foreign Application Priority Data

Nov. 2, 2020 (DE) ..................... 10 2020 128 812.3
Nov. 17, 2020 (DE) ..................... 10 2020 130 355.6

(51) Int. Cl.
*B60N 2/12* (2006.01)
*B60N 2/02* (2006.01)
*B60N 2/90* (2018.01)

(52) U.S. Cl.
CPC ........... *B60N 2/12* (2013.01); *B60N 2/02253*
(2023.08); *B60N 2002/952* (2018.02)

(58) Field of Classification Search
CPC ................ B60N 2/12; B60N 2/202253; B60N
2002/952; B60N 2/3065; B60N 2/10
See application file for complete search history.

(56) References Cited

U.S. PATENT DOCUMENTS 11,260,776 B1 * 3/2022 Aktas ................. B60N 2/02246
11,390,196 B2 * 7/2022 Epaud ..................... B60N 2/12
(Continued)

FOREIGN PATENT DOCUMENTS

CN 104736383 A 6/2015
CN 105813889 A 7/2016
(Continued)

OTHER PUBLICATIONS

European Patent Office, International Search Report and Written
Opinion of the International Searching Authority, issued in PCT/
IB2021/059964, Jan. 27, 2022, Rijswijk, Netherlands, 14 pages.

*Primary Examiner* — David R Dunn
*Assistant Examiner* — Jessica Kathryn Thompson
(74) *Attorney, Agent, or Firm* — Marshall & Melhorn,
LLC

(57) ABSTRACT

A vehicle seat having a seat part, a backrest, a kinematics
system for transferring the vehicle seat from a use position
into an entry position and back, a drive apparatus for driving
the kinematics system, and a coupling apparatus for cou-
pling the drive apparatus to the kinematics system. The
coupling apparatus has a pawl and a counter-element. The
pawl and the counter-element are locked to one another in
order to couple the drive apparatus to the kinematics system,
wherein the pawl is released from the counter-element by an
actuation of the coupling apparatus, resulting in the drive
apparatus being decoupled from the kinematics system. The
pawl is configured as a bracing pawl, and the pawl and the
counter-element are locked to one another beyond a self-
locking action.

13 Claims, 10 Drawing Sheets

(56)     References Cited

U.S. PATENT DOCUMENTS

| | | | | |
|---|---|---|---|---|
| 2002/0060487 | A1* | 5/2002 | Makosa | B60N 2/1615 |
| | | | | 297/344.1 |
| 2011/0049953 | A1 | 3/2011 | Champ | |
| 2017/0253146 | A1* | 9/2017 | Cooley | B60N 2/123 |
| 2019/0152352 | A1* | 5/2019 | Handigol | B60N 2/12 |
| 2019/0225130 | A1* | 7/2019 | Kish | B60N 2/12 |
| 2022/0032822 | A1* | 2/2022 | Rdzanek | B60N 2/3045 |

FOREIGN PATENT DOCUMENTS

| | | | |
|---|---|---|---|
| CN | 110103784 | A | 8/2019 |
| CN | 110949203 | A | 4/2020 |
| CN | 111051125 | A | 4/2020 |
| DE | 102018208641 | A1 | 12/2019 |
| DE | 102019133959 | A1 | 3/2021 |
| WO | 200183258 | A1 | 11/2001 |
| WO | 2015104228 | A1 | 7/2015 |
| WO | 2019096774 | A2 | 5/2019 |

\* cited by examiner

VEHICLE SEAT

FIELD

The invention relates to a vehicle seat, in particular a motor vehicle seat, with a seat part, a backrest, a kinematics system for transferring the vehicle seat from a use position, suitable for passenger transport, into an entry position and back, a drive apparatus for driving the kinematics system, and a coupling apparatus for coupling the drive apparatus to the kinematics system, the coupling apparatus having a pawl and a counter-element, in particular a pin, it being possible for the pawl and the counter-element to be locked to one another in order to couple the drive apparatus to the kinematics system, and it being possible for the pawl to be released from the counter-element by way of an actuation of the coupling apparatus, as a result of which the drive apparatus can be decoupled from the kinematics system.

BACKGROUND

WO 01/83258 A1 discloses a catch hook of a backrest adjusting fitting for vehicle seats, which catch hook, for releasably locking the fitting part which can be pivoted together with a seat part and, in the locked position, bears against a stop of a seat base frame, is secured in a rotationally articulated manner on this fitting part and is loaded by a force accumulator in a locking direction, and the catch hook engages with its hook mouth behind the stop in the locked position, the catch hook being coordinated with a bracing pawl which likewise engages behind the stop in the locked position, is for its part mounted pivotably on the catch hook itself, and can be released if required from the locked position by an actuating link, the bracing pawl being loaded in the locking direction solely by way of a single force accumulator, and the bracing pawl being coupled to the catch hook via supporting links such that it can run at a higher speed in the movement direction.

DE 10 2019 133 959 A1 has disclosed a vehicle seat, with a seat part, a backrest, and a kinematics system for transferring the vehicle seat from a use position, suitable for passenger transport, into an entry position, in particular an entry position which facilitates the entry into a rear seat row, it being possible for the vehicle seat to be transferred by a drive apparatus from the use position into the entry position and vice versa, it being possible for the kinematics system and the drive apparatus to be coupled to one another by a coupling apparatus for the driven transfer of the vehicle seat, it being possible for the kinematics system to be decoupled from the drive apparatus by an actuation of the coupling apparatus, for a manual transfer of the vehicle seat into the entry position. The coupling apparatus has a coupling device which is mounted pivotably about a rotational axis. The coupling device has a pawl which can be operatively connected to the pin, and an unlocking lever which interacts with the coupling device. If an actuation of the unlocking lever brings about unlocking of the coupling device, the pawl is opened, with the result that the pin can exit from the coupling device.

WO 2015/104228 A1 discloses a vehicle seat with a drive apparatus which comprises a pinion which is in toothing engagement with a toothing system of a height adjustment kinematics system, the drive apparatus being fastened to a structural part of the vehicle seat.

SUMMARY

The invention is based on the problem of improving a vehicle seat of the type mentioned at the outset, in particular a vehicle seat of the type which can both be transferred from a use position into an entry position in a manner which is driven by electric motor, and can be transferred manually from the use position into the entry position in order to provide an emergency exit, with fewer components and costs which are reduced as a result.

According to the invention, this problem is solved by way of a vehicle seat, in particular a motor vehicle seat, with a seat part, a backrest, a kinematics system for transferring the vehicle seat from a use position, suitable for passenger transport, into an entry position and back, a drive apparatus for driving the kinematics system, and a coupling apparatus for coupling the drive apparatus to the kinematics system, the coupling apparatus having a pawl and a counter-element, in particular a pin, it being possible for the pawl and the counter-element to be locked to one another in order to couple the drive apparatus to the kinematics system, and it being possible for the pawl to be released from the counter-element by way of an actuation of the coupling apparatus, as a result of which the drive apparatus can be decoupled from the kinematics system, the pawl being configured as a bracing pawl, it being possible for the pawl and the counter-element to be locked to one another beyond the self-locking action.

The bracing pawl preferably has a bracing cam (curved bearing face) for interaction with the counter-element, in particular the pin. The slope of the bracing cam is selected in such a way that there is no self-locking action between the bracing cam and the counter-element, but, in normal operation of the vehicle seat, an opening torque which acts on the bracing pawl by way of said normal operation is smaller than a closing torque which opposes it and is generated, in particular, by a preloaded spring which loads the bracing pawl with a spring force in the closing direction.

In mechanics, self-locking describes a resistance, caused by friction, against slipping or rotating of two bearing faces of two bodies which bear against one another. As soon as static friction is overcome, the bearing faces are no longer in the self-locking action and move with respect to one another. The self-locking action is influenced, in particular, by an angle of inclination between the bearing faces, the surface roughness of the bearing faces and the material pairing.

By virtue of the fact that the pawl is configured as a bracing pawl, it being possible for the pawl and the counter-element to be locked to one another beyond the self-locking action, no unlocking mechanism is necessary for decoupling the kinematics system from the drive apparatus. A bracing pawl is used which opens automatically if a defined actuating force is introduced, for example introduced at a backrest upper edge of the backrest. An actuation (that is to say, unlocking in the present case) of the coupling apparatus can therefore take place by introduction of a defined load, in particular introduced at a backrest upper edge. For manual decoupling of the vehicle seat from the drive apparatus, in particular for an emergency exit by a manual transfer of the vehicle seat from the use position into the entry position, no unlocking mechanism (in particular, no Bowden cable) is therefore required. This results in a cost reduction in comparison with the vehicle seat described in DE 10 2019 133 959 A1.

By virtue of the fact that the kinematics system can be decoupled from the drive apparatus by an actuation of the coupling apparatus for the manual transfer of the vehicle seat into the entry position, a possibility is provided of transferring the vehicle seat into at least the entry position in emergency situations or situations, in which an energy supply of the drive apparatus has failed or is switched off, in order to ensure easy access to or exit from an interior compartment of a vehicle.

In the entry position, parts of the vehicle seat, in particular the backrest and the seat part, are preferably pivoted forward, in order to facilitate the access to a rear seat row. Here, the vehicle seat can also have a longitudinal adjuster which has seat rails and can be unlocked in order to assume the entry position, with the result that the vehicle seat can additionally be pushed forward.

The vehicle seat can be a vehicle seat within a multiple-part seat bench. The vehicle seat can be an undivided seat bench.

The seat part can be capable of being connected at least indirectly to a vehicle structure. The vehicle seat can be capable of being connected to at least one seat rail of a longitudinal adjuster. The longitudinal adjuster can have a seat rail and a floor rail which can be displaced relative to the seat rail, which rails can be locked to one another in order to set a seat longitudinal position. The longitudinal adjuster can be a longitudinal adjuster which can be driven by electric motor. The longitudinal adjuster can be capable of being unlocked for the manual transfer of the vehicle seat into the entry position. Unlocking of the longitudinal adjuster can be coupled to an actuation of the coupling apparatus, with the result that the longitudinal adjuster unlocks when the coupling apparatus is decoupled from the drive apparatus.

The counter-element can preferably be locked exclusively to the pawl. In particular, a use of a further pawl, for example a catch pawl, can be dispensed with. The coupling apparatus can therefore preferably be locked exclusively beyond the self-locking action. A force accumulator, in particular a spring, can preload the pawl in the direction of a position, in which it is locked to the counter-element. As a result, during normal operation of the vehicle seat, opening of the pawl which is designed as a bracing pawl (beyond the self-locking action) can be avoided.

The coupling apparatus can be capable of being actuated by way of the application of an actuating force to the vehicle seat, in particular to the backrest of the vehicle seat; that is to say, the pawl can be opened by way of the application of the actuating force to the vehicle seat. By way of the application of the actuating force to the vehicle seat, the pawl can be capable of being loaded with an opening torque via the counter-element, it being possible for the pawl to be released from the counter-element by the opening torque being greater than a closing torque which is exerted on the pawl by way of the force accumulator.

The drive apparatus can have an electric motor. The drive apparatus can have an electric motor and a gear mechanism. The drive apparatus can have a geared motor. The drive apparatus can have a spindle drive or can drive a spindle drive. The drive apparatus can have a gear mechanism with an output shaft, a pinion being connected to the output shaft, in particular.

The coupling apparatus can have a coupling device and a coupling link. The coupling link is preferably operatively connected to the drive apparatus. The coupling link can be connected to a spindle nut. The coupling link can be connected pivotably to a spindle nut. The spindle nut can interact with a spindle, in particular a spindle of the drive apparatus. The spindle nut can be screwed onto the spindle.

The coupling link can have a toothing system. The toothing system can be an internal toothing system. The toothing system can be an external toothing system. The toothing system can interact with a pinion, in particular a pinion of the drive apparatus.

The pawl can be articulated on one of the coupling device and the coupling link, and the counter-means element can be fastened to the other one of the coupling device and the coupling link. The pawl can be articulated pivotably on a carrier of the coupling device. The coupling device and the coupling link can be mounted pivotably about a common pivot axis. In the actuated state of the coupling apparatus, the coupling device and the coupling link can be capable of being pivoted relative to one another about the common pivot axis. The common pivot axis can be aligned with a rotational axis of a rotary joint of the kinematics system. The common pivot axis can be aligned with a rotational axis of a rotary joint of a motion link of the kinematics system. The kinematics system can have a motion link, it being possible for the motion link to be pivoted by a rotary joint about the common pivot axis.

In summary and in other words, the problem is solved according to the invention by way of a vehicle seat, in particular a motor vehicle seat, with a seat part, a backrest, and a kinematics system for transferring the vehicle seat from a use position, suitable for passenger transport, into an entry position, in particular an entry position which facilitates the entry into a rear seat row, it being possible for the vehicle seat to be transferred by a drive apparatus from the use position into the entry position and vice versa, it being possible for the kinematics system and the drive apparatus to be coupled to one another by a coupling apparatus for the driven transfer of the vehicle seat, it being possible for the kinematics system to be decoupled from the drive apparatus by way of an actuation of the coupling apparatus, for a manual transfer of the vehicle seat into the entry position, the coupling apparatus having a pawl which, in particular, can be operatively connected to a pin, the pawl being configured as a bracing pawl.

BRIEF DESCRIPTION OF THE FIGURES

In the following text, the invention is explained in greater detail on the basis of two advantageous exemplary embodiments which are shown in the figures. The invention is not restricted to these two exemplary embodiments, however. In the figures, diagrammatically.

DETAILED DESCRIPTION

Figure 1:
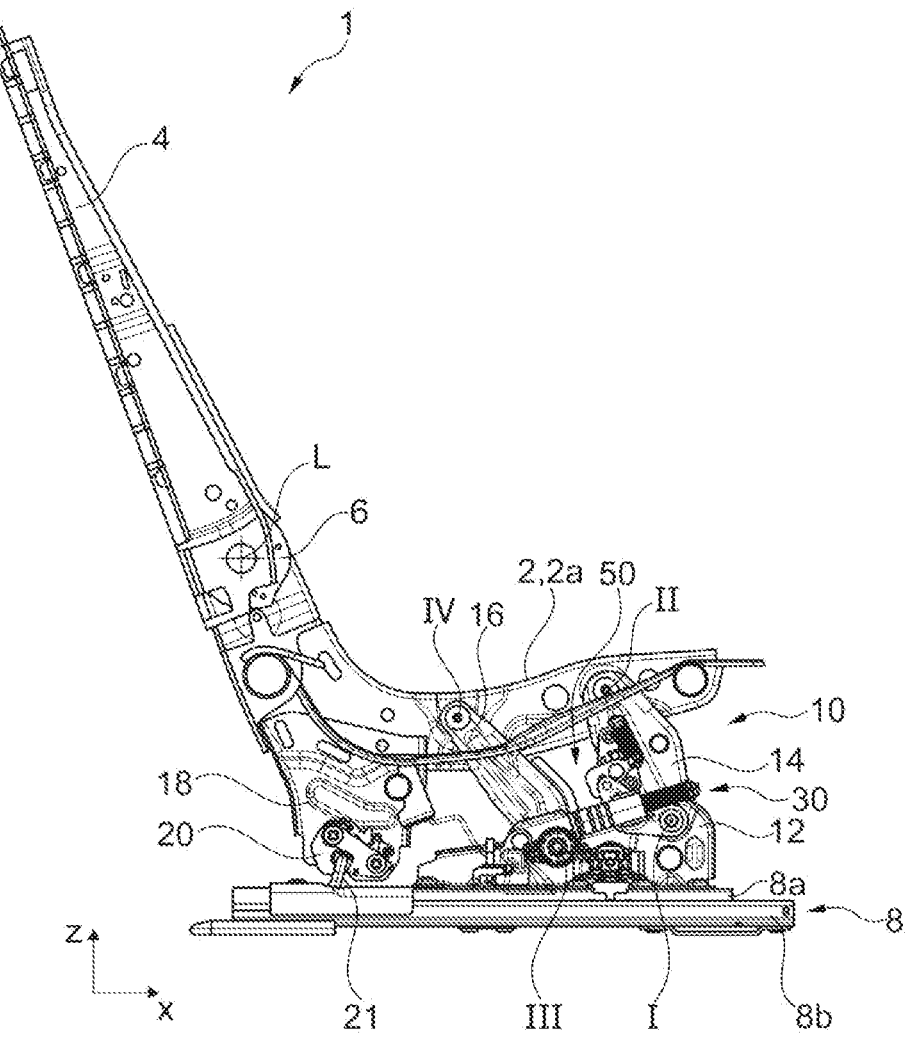
FIG. 1 shows a side view of a vehicle seat according to the invention in accordance with a first exemplary embodiment in a use position.

FIGS. 1 to 12 show a first exemplary embodiment of a vehicle seat 1 according to the invention. The vehicle seat 1, and a vehicle seat 100 (shown in FIGS. 13 to 16) of a second exemplary embodiment, will be described in the following text with use of three spatial directions which run perpendicularly with respect to one another. In the case of a vehicle seat 1; 100 which is installed in the vehicle, a longitudinal direction x runs largely horizontally and preferably parallel to a vehicle longitudinal direction which corresponds to the usual direction of travel of the vehicle. A transverse direction y which runs perpendicularly with respect to the longitudinal direction x is likewise oriented horizontally in the vehicle, and runs parallel to a vehicle transverse direction. A vertical direction z runs perpendicularly with respect to the longitudinal direction x and perpendicularly with respect to the transverse direction y. In the case of a vehicle seat 1; 100 which is installed in the vehicle, the vertical direction z runs parallel to the vehicle vertical axis.

The position and direction specifications used such as, for example, front, rear, top and bottom relate to a viewing direction of an occupant seated in the vehicle seat 1; 100 in a normal seat position, the vehicle seat 1; 100 being installed in the vehicle, in a use position suitable for passenger transport with an upright backrest 4 and oriented as is customary in the direction of travel.

The vehicle seat 1; 100 which is provided, for example, as an outer seat of a middle or rear seat row of a motor vehicle, for example of a van, has a seat part 2 and a backrest 4. The backrest 4 can be adjusted in terms of its inclination about a backrest pivot axis L by at least one fitting 6 (in the present case, two fittings 6), with the result that a plurality of use positions are designed. The term seat part 2 is intended to be understood to mean the entire assembly, having a seat part structure 2a and an upholstered cushion. If components are articulated on the seat part 2, this is to be understood to mean an articulation on the seat part structure 2a of the seat part 2. This applies correspondingly to the backrest 4.

In the following text, only one vehicle seat side of the substantially symmetrical vehicle seat 1; 100 will be described for the sake of simplicity; that is to say, the components mentioned in the following text can be present twice (possibly in a mirror-symmetrical manner), if not described otherwise.

Figure 2:
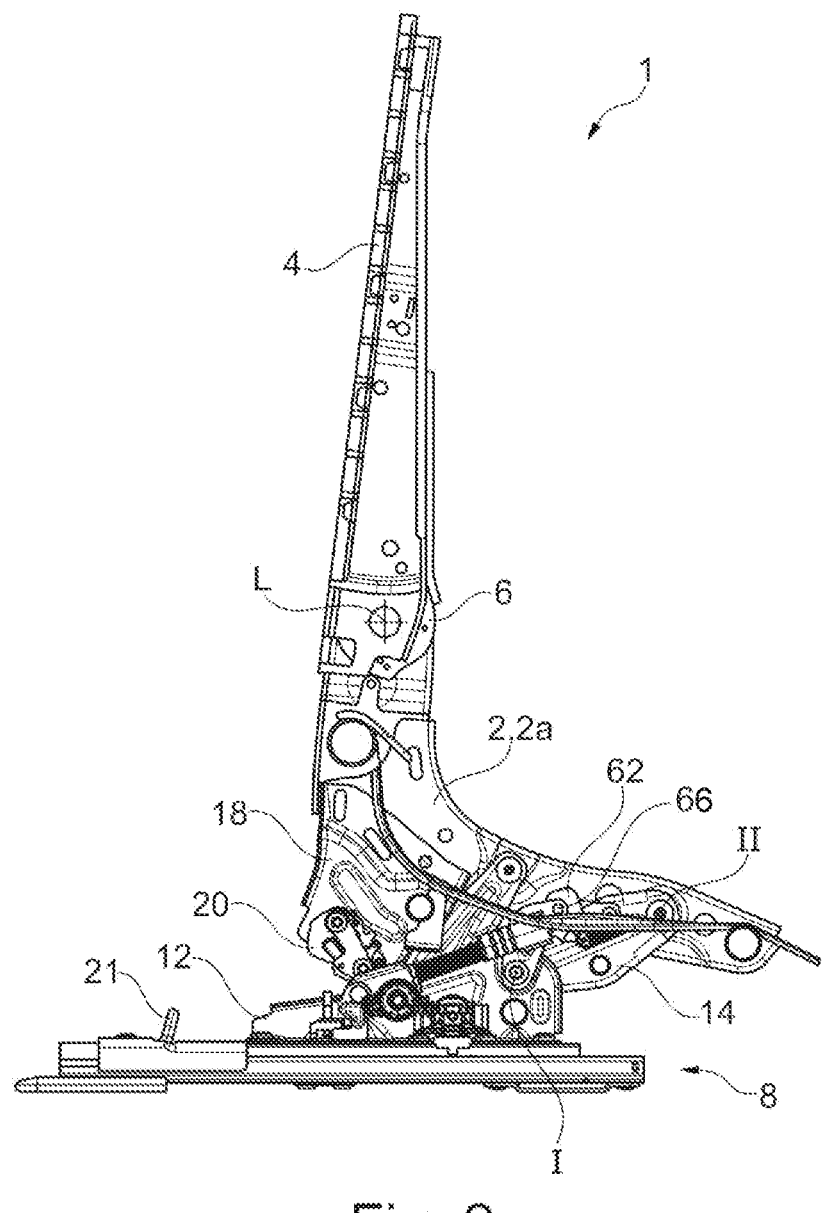
FIG. 2 shows a side view of the vehicle seat from FIG. 1 in an entry position.
Figure 3:
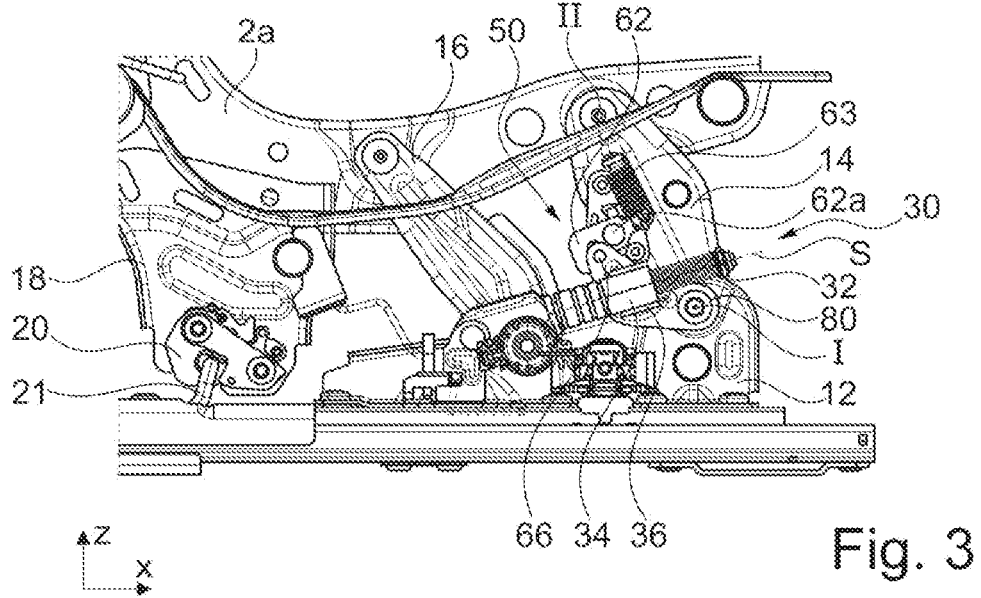
FIG. 3 shows details of a side view of the vehicle seat from FIG. 1, in particular of a drive apparatus, configured as a spindle drive for a four-bar linkage kinematics system, and a coupling apparatus.
Figure 4:
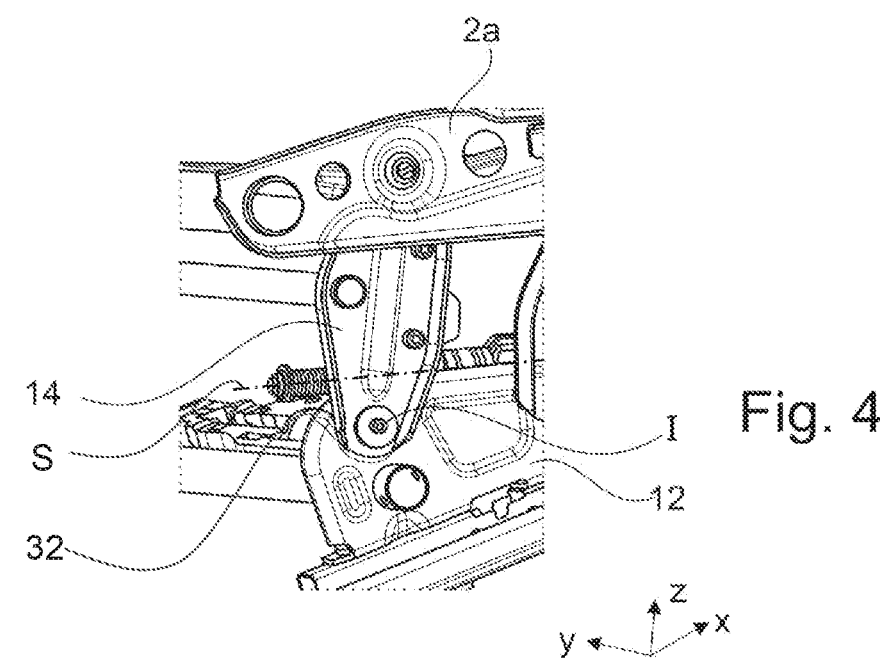
FIG. 4 shows details of a perspective view of the vehicle seat from FIG. 1, in particular of a motion link of the four-bar linkage kinematics system.

First of all, the vehicle seat 1 of the first exemplary embodiment will be described on the basis of a use position shown in FIG. 1 and an entry position (easy entry position) shown in FIG. 2. The use position serves for transport of at least one seat occupant. The entry position makes comfortable access to a seat row arranged behind the vehicle seat 1 possible.

A base of the vehicle seat 1 can be connected to a structure of the motor vehicle, in particular a vehicle floor. In the present case, the base is configured as a longitudinal adjuster 8 which offers the possibility of a longitudinal adjustment in and counter to the longitudinal direction x of the vehicle seat 1. In the present case, the base has a floor rail 8b which can be connected directly to the vehicle structure, and a seat rail 8a which can be displaced relative to the former in the longitudinal direction x. The two profile rails 8a, 8b engage mutually behind one another with their inwardly and outwardly bent longitudinal edges. In the present case, the longitudinal adjuster 8 can be moved in a manner known per se by a spindle drive into any desired longitudinal adjustment position within a predefined adjustment range. As an alternative, a longitudinal adjuster can likewise be provided, the rails 8a, 8b of which can be locked to one another by a rail locking device which is known per se, it being possible for the rail locking device to be unlocked manually by an occupant of the vehicle seat 1 via an unlocking handle which is known per se.

A front foot 12 is attached to the base, in the present case is connected fixedly to the seat rail 8a. As an alternative, however, the front foot 12 can also be locked releasably to the base, in particular to the seat rail 8a.

The seat part 2 is articulated by a motion link 14 in the region of a front end of the front foot 12, this motion link 14 having two ends, and a rotary joint I, II being provided in each case in the region of these two ends, of which a first rotary joint I forms an articulation of the motion link 14 at the front foot 12 and a second rotary joint II forms an articulation of the motion link 14 at the front end of the seat part 2. The motion link 14 of the left-hand vehicle seat side can be connected to the motion link 14 of the right-hand vehicle seat side via a transverse connection, in the present case a cross tube 22.

The seat part 2 is articulated on the front foot 12 by a link 16 which is arranged behind the motion link 14. The link 16 has two ends, a rotary joint III, IV being provided in each case in the region of these two ends. A third rotary joint III forms an articulation of the link 16 on the front foot 12, and a fourth rotary joint IV forms an articulation of the link 16 on the seat part 2. Precisely one link 16 of this type is arranged correspondingly on the two sides of the vehicle seat 1.

The front foot 12, the motion link 14, the link 16 and the seat part 2 form a kinematics system 10, in the present case a four-bar linkage arrangement. The vehicle seat 1 can be moved by the kinematics system 10 along a predefined movement path from the use position into the entry position and back.

Furthermore, a rear foot 18 which is arranged separately from the front foot 12 is arranged on the base behind the front foot 12 in the longitudinal direction x. The rear foot 18 of the left-hand vehicle seat side is connected to the rear foot 18 of the right-hand vehicle seat side via a transverse connection. The rear foot 18 is locked releasably to the base by a lock 20 which is attached to the rear foot 18, more precisely to a closing element which is fixed on the base, in the present case to a lock bracket 21 which is fastened to the seat rail 8*a*, and can therefore be connected indirectly to the vehicle structure. In a state in which it is locked to the lock 20, the lock bracket 21 is centered in a slot-like receiving opening of the rear foot 18 or, as an alternative, of a lock housing of the lock 20, and is prevented from leaving the receiving opening by a rotary catch of the lock 20. The receiving opening has a V-shaped contour and is open in the direction of the base. The receiving opening tapers conically in a direction which is oriented away from the base. In the use position of the vehicle seat 1, the receiving opening and the rotary catch of the lock 20 fix the rear foot 18 relative to the base.

A drive apparatus 30 and a coupling apparatus 50 are arranged on one of the two vehicle seat sides in the region of the motion link 14. The drive apparatus 30 and the coupling apparatus 50 are not necessarily provided and arranged on both sides, in particular not symmetrically with respect to a center plane of the vehicle seat 1. Depending on the installation situation of the vehicle seat 1 in a vehicle, the drive apparatus 30 and the coupling apparatus 50 can selectively be arranged on the left-hand or the right-hand vehicle seat side.

The drive apparatus 30 has an electric motor 30*a* and a gear mechanism 30*b* which is connected to the electric motor 30*a*. A spindle 32 which can be driven rotationally about a spindle axis S by the electric motor 30*a* is arranged on the output side of the gear mechanism 30*b*. The electric motor 30*a* is preferably held fixably in a counter-bearing relative to the front foot 12 on the base of the vehicle seat 1. A spindle nut 34 which is held in a connecting link 36 can be moved along the spindle 32 in the direction of the spindle axis S by way of a rotational movement of the spindle 32 about the spindle axis S. The spindle nut 34 moves translationally along the spindle 32 when the spindle 32 rotates.

The coupling apparatus 50 has a coupling device 60 and a coupling link 64 which can both be pivoted about a common pivot axis which is aligned with the pivot axis of the first rotary joint I.

A connecting link 36 which receives the spindle nut 34 is connected pivotably to the coupling link 64 of the coupling apparatus 50. The coupling link 64 is mounted on the front foot 12 pivotably about a second bearing pin 80. The coupling link 64 has a pin 66. The pin 66 is a counter-element which can be locked to a pawl 62. The pin 66 is preferably welded to the coupling link 64.

The coupling device 60 has a carrier 61 and the pawl 62 which is configured as a bracing pawl and is mounted on the carrier 61 rotatably about a first bearing pin 62*a*. The carrier 61 is connected fixedly to the motion link 14. In one modification of the first exemplary embodiment, the carrier 61 can be configured in one piece with the motion link 14.

The pawl 62 of the coupling device 60 interacts in a locking manner with the pin 66 of the coupling link 64. The pawl 62 is preloaded by a spring 63 in the direction of a position, in which it locks to the pin 66.

The pawl 62 is designed beyond the self-locking action, that is to say the pin 66 exerts an opening torque on the pawl 62 under load. The force of the spring 63 counteracts this opening torque in a locking manner until the opening torque is greater than a counter-torque which is generated by way of the force of the spring 63. If the torque which is exerted on the pawl 62 by way of the pin 66 exceeds the counter-torque, the pawl 62 opens and releases the pin 66.

Figure 5:
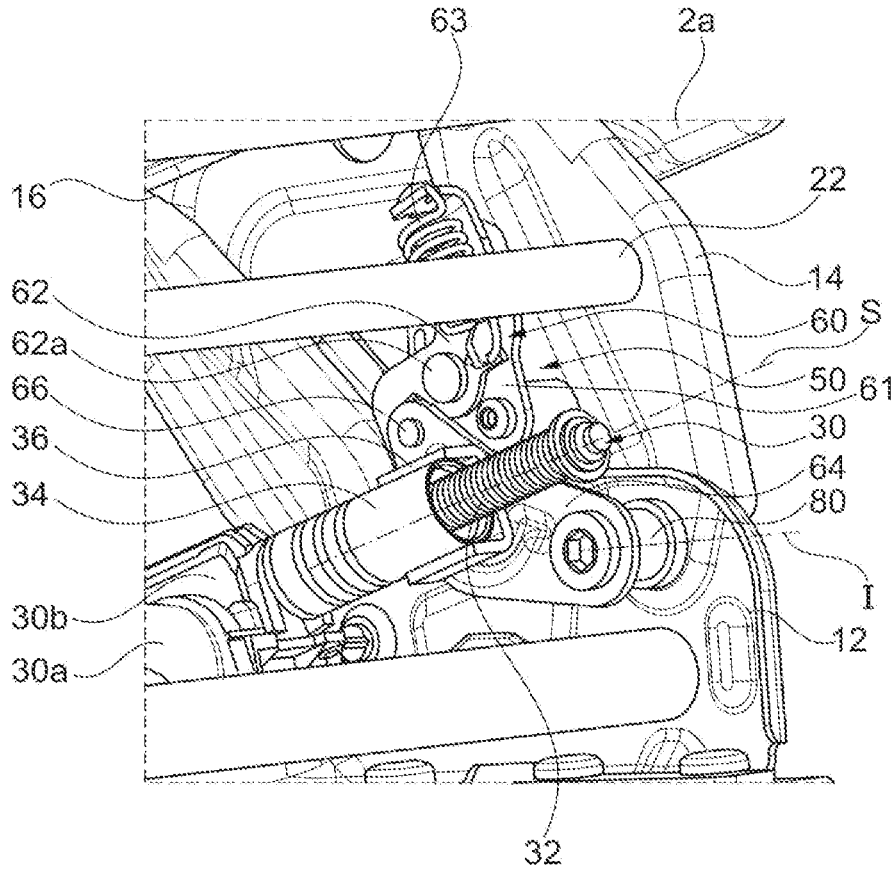
FIG. 5 shows details of a perspective view of the vehicle seat from FIG. 1, in particular of the drive apparatus and a coupling apparatus.
Figure 5:
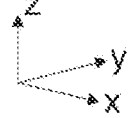

FIG. 5 shows details of a perspective view of the vehicle seat 1, in particular a perspective view of the pawl 62 and the drive apparatus 30, the pawl 62 being situated in a state, in which it locks the pin 66. In the state in which it is locked to the pin 66, the pawl 62 couples the carrier 61 and therefore the motion link 14 to the coupling link 64 and therefore to the drive apparatus 30, with the result that both the coupling link 64 and the coupling device 60 can be pivoted by the drive apparatus 30.

A transfer of the vehicle seat 1 from the use position into the entry position facilitates the access to a seat row which is arranged behind the vehicle seat 1. The assuming of this entry position by the drive apparatus 30 is described in the following text on the basis of FIGS. 6 to 8.

Figure 6:
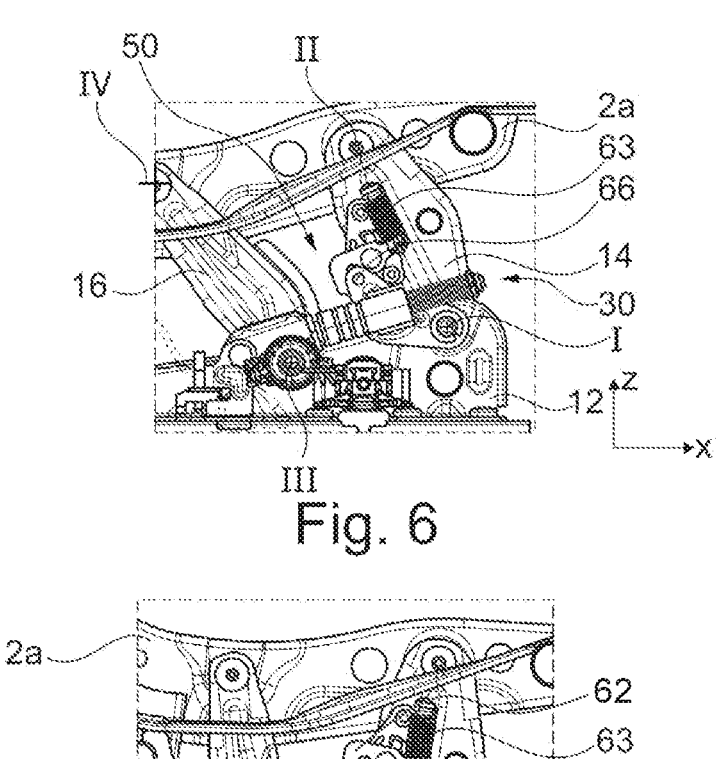
FIG. 6 shows details of the vehicle seat from FIG. 1 in the use position.
Figure 7:
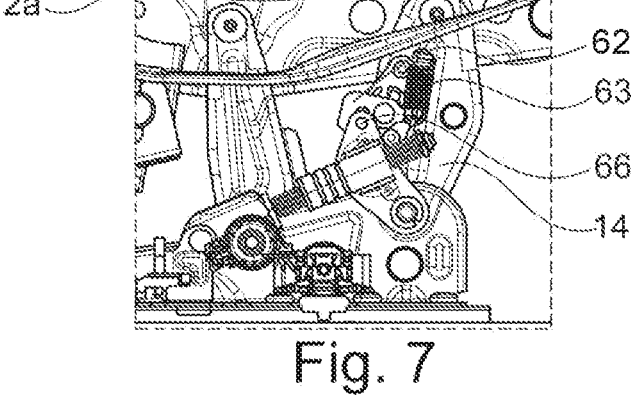
FIG. 7 shows details of the vehicle seat from FIG. 1 during a transfer, driven by electric motor by the drive apparatus, into the entry position.
Figure 8:
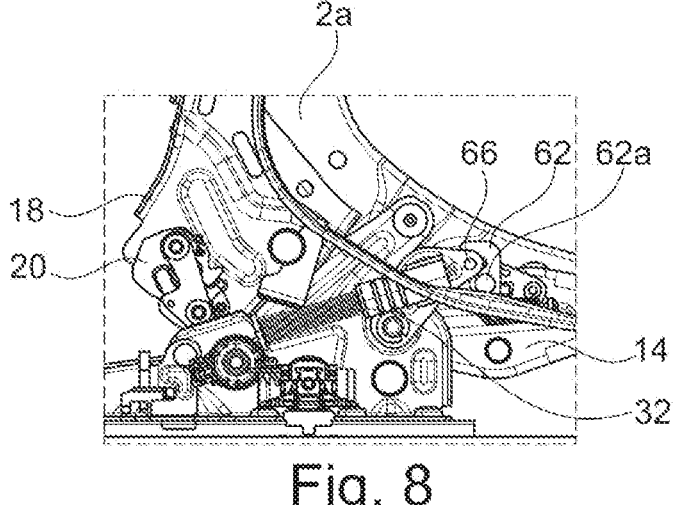
FIG. 8 shows details of the vehicle seat from FIG. 1 in the entry position.

FIG. 6 shows the use position of the vehicle seat 1. FIG. 7 shows the vehicle seat 1 during the transfer into the entry position. After the two locks 20 are unlocked by way of an actuator which is not shown in the figures and is, in particular, electromechanical, the drive apparatus 30 drives the motion link 14 via the pawl 62 in the above-described way. Here, the force which the pin 66 exerts on the pawl 62 does not exceed a limit force which would open the pawl 62. FIG. 8 shows the vehicle seat 1 in the entry position.

For decoupling of the drive apparatus 30 from the motion link 14, in particular in order to provide an emergency exit by way of assuming of the entry position after an accident, the two locks 20 are first of all to be unlocked manually by the operating lever 96, as a result of which the rear feet 18 are decoupled from the base, in the present case the seat rail 8*a*. No active unlocking of the pawl 62 is subsequently required, however.

In one modification (not shown in the figures) of the exemplary embodiment, two pull loops, in particular made from a textile strap, are provided instead of the operating lever 96 for manual unlocking of the two locks 20. A first pull loop is guided rearward and serves, in particular, to unlock the two locks 20 by way of a person who is seated on a further seat row which is arranged behind the vehicle seat 1. A second pull loop is guided forward and serves, in particular, to unlock the two locks 20 from the front by way of a person situated next to or in front of the vehicle seat 1.

Unlocking of the pawl 62 can take place by way of the application of an actuating force, in particular acting forward parallel to the longitudinal direction x, on the backrest upper edge of the backrest 4. Subsequently, the vehicle seat 1 can be pivoted forward completely by the kinematics system 10 into the entry position in order to provide the emergency exit. In this way, in particular, an additional Bowden cable and a further operating lever for actuating the pawl 62 can be dispensed with.

Figure 9:
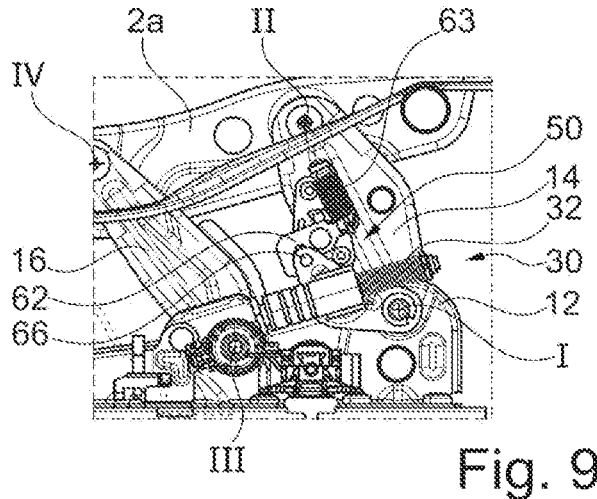
FIG. 9 shows details of the vehicle seat from FIG. 1 in the use position.
Figure 10:
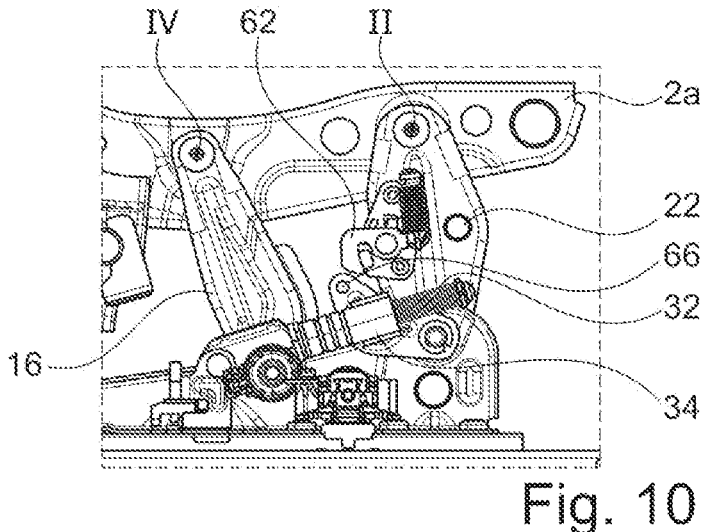
FIG. 10 shows details of the vehicle seat from FIG. 1 with an open pawl of the coupling apparatus and during a manual transfer into the entry position.
Figure 11:
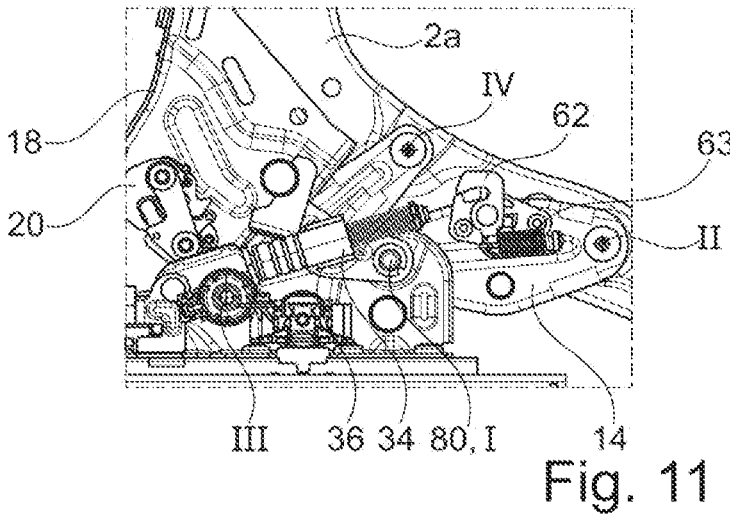
FIG. 11 shows details of the vehicle seat from FIG. 1 with an open pawl of the coupling apparatus and in the entry position, FIG. 12 highly diagrammatically shows details of a perspective view of the vehicle seat from FIG. 1, in particular of a Bowden cable apparatus for synchronized unlocking of two locks by an operating lever.
Figure 12:
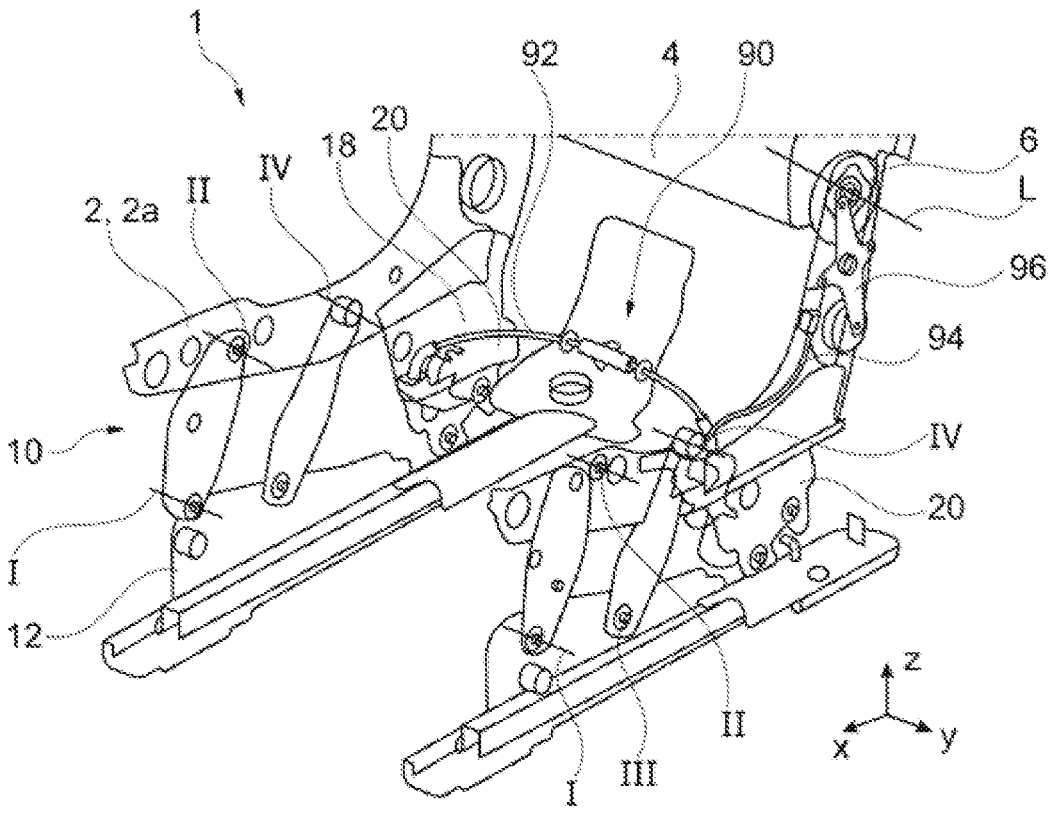
Figure 13:
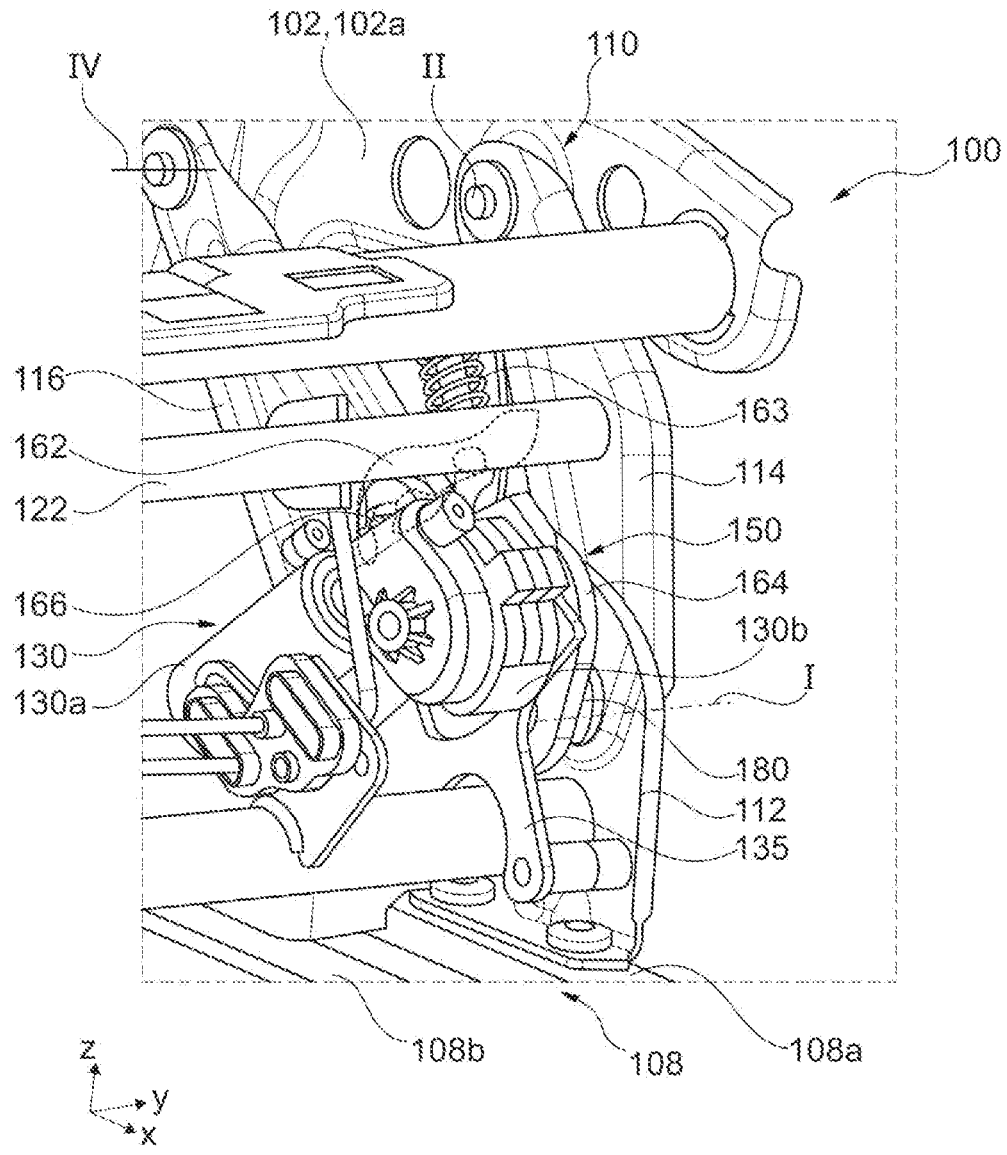
FIG. 13 shows details of a perspective view of the vehicle seat in accordance with a second exemplary embodiment in a use position, in particular of a drive apparatus and a coupling apparatus.
Figure 14:
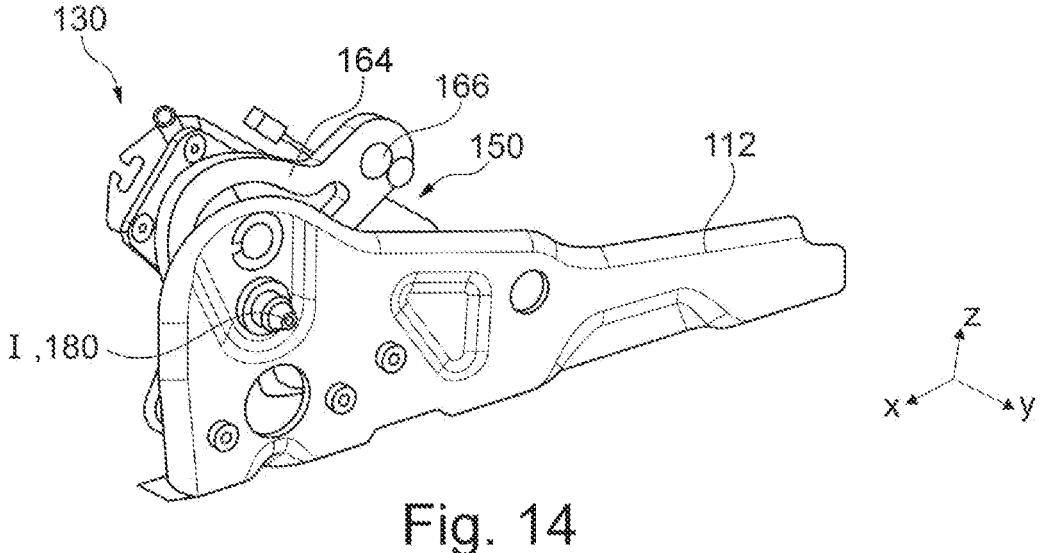
FIG. 14 shows a perspective view of a front foot, the drive apparatus and the coupling apparatus of the vehicle seat from FIG. 13.
Figure 15:
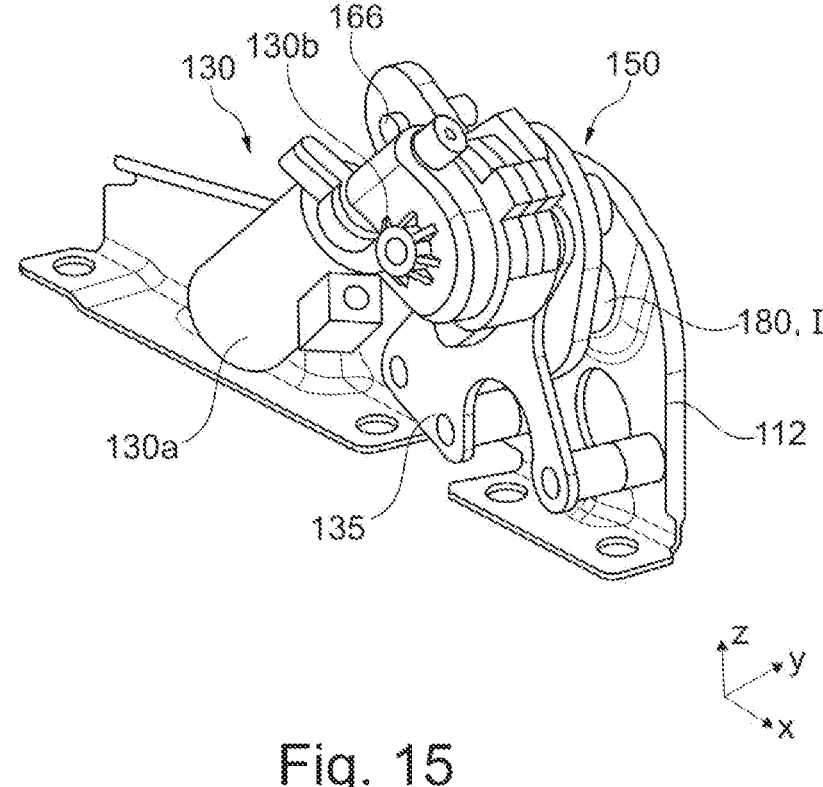
FIG. 15 shows a view, corresponding to FIG. 14, from another viewing direction.
Figure 16:
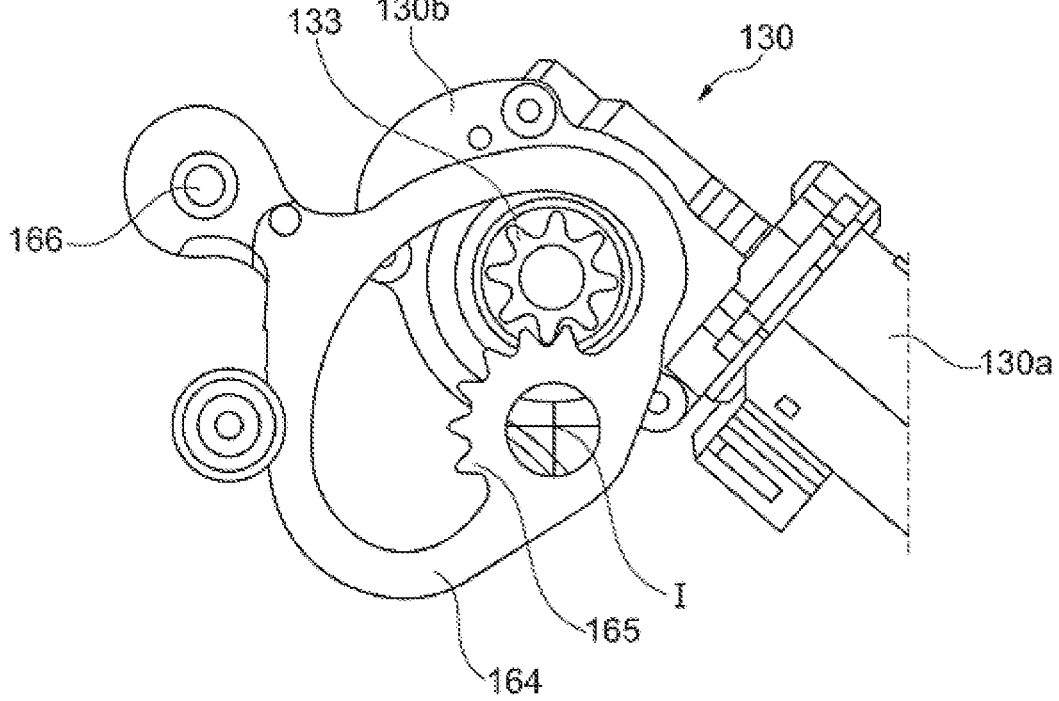
FIG. 16 shows a side view of a coupling link of a coupling apparatus and the drive apparatus of the vehicle seat from FIG. 13.

The assuming of the entry position as emergency exit is described in detail in the following text on the basis of FIGS. 9 to 11. FIG. 9 shows the use position of the vehicle seat 1. By way of the backrest upper edge of the backrest 4 being pressed forward, the pawl 62 opens (after the locks 20 have previously been opened). FIG. 10 shows the vehicle seat 1 during the transfer into the entry position by way of pressing on the backrest upper edge in the case of an open pawl 62, and FIG. 11 shows the vehicle seat 1 in the entry position. The decoupled drive apparatus 30 preferably remains non-actuated during the transition.

In normal use of the vehicle seat, a misuse force which acts forward on the backrest 4 can be introduced in the entry position into an end stop of the seat structure of the vehicle seat 1, with the result that the pawl 62 is not loaded in the above-described way with an opening torque. A rearwardly acting misuse force on the backrest 4 acts on the spindle 32. Here, the pawl 62 likewise does not open.

The vehicle seat 1 has a Bowden cable apparatus 90 (shown in FIG. 12) for manually unlocking the locks 20. The Bowden cable apparatus 90 comprises a first Bowden cable 92, a second Bowden cable 94 and an operating lever 96. The two locks 20 can be unlocked synchronously with one another by the first Bowden cable 92. The second Bowden cable 94 connects the operating lever 96 to one of the two locks 20. By way of actuation of the operating lever 96, the two locks 20 can be unlocked synchronously via the Bowden cables 92, 94. The Bowden cable apparatus 90 serves to provide an emergency exit, by it being possible for the locks to be unlocked manually. The above-described electromechanical actuator therefore does not have to be energized for an emergency exit.

FIGS. 13 to 16 show the second exemplary embodiment of a vehicle seat 100 according to the invention. The construction and the method of operation of the vehicle seat 100 correspond to the vehicle seat 1 of the first exemplary embodiment unless described otherwise in the following text, with the result that the description of the vehicle seat 1 also applies correspondingly to the vehicle seat 100. Identical or identically acting components have designations which are higher by 100.

The vehicle seat 100 has a seat part 102, a backrest, a longitudinal adjuster 108 with a seat rail 108a and a floor rail 108b, a kinematics system 110 with a front foot 112, a motion link 114 and a link 116, a drive apparatus 130 and a coupling apparatus 150.

The vehicle seat 100 differs from the vehicle seat 1 of the first exemplary embodiment essentially only by way of a different construction, described in the following text, of the drive apparatus 130 and the coupling apparatus 150.

The coupling apparatus 150 has a coupling device 160 and a coupling link 164. The coupling link 164 is mounted on the front foot 112 pivotably about a second bearing pin 180. The coupling device 160 comprises a pawl 162 which is mounted by a first bearing pin 162a and is loaded with a torque in a closing direction by a spring 163. The pawl 162 can be locked to a counter-element, in the present case a pin 166 of the coupling link 164, in the above-described way beyond the self-locking action.

The drive apparatus 130 of the vehicle seat 100 has a motor 130a and a gear mechanism 130b. The drive apparatus 130 is connected to the front foot 112 by an adapter 135. As output, the gear mechanism 130b has a pinion 133 which is in toothing engagement with a toothing system 165 of the coupling link 164. By way of actuation of the motor 130a, the pinion 133 rotates and, as a result, rolls in the toothing system 165, with the result that the coupling link 164 pivots.

The difference between the vehicle seat 1 of the first exemplary embodiment and the vehicle seat 100 of the second exemplary embodiment consists exclusively in that, in the first exemplary embodiment, the drive apparatus 30 drives the coupling link 64 via a spindle 32, while, in the second exemplary embodiment, the drive apparatus 130 drives the coupling link 164 via a pinion 133. Otherwise, the exemplary embodiments correspond to one another.

LIST OF DESIGNATIONS

1; 100 Vehicle seat
2; 102 Seat part
2a; 102a Seat part structure
4 Backrest
6 Fitting
8; 108 Longitudinal adjuster

8a; 108a Seat rail
8b; 108b Floor rail
10; 110 Kinematics system
12; 112 Front foot
14; 114 Motion link
16; 116 Link
18 Rear foot
20 Lock
21 Lock bracket
22 Cross tube
30, 130 Drive apparatus
30a; 130a Electric motor
30b; 130b Gear mechanism
32 Spindle
34 Spindle nut
36 Connecting link
50; 150 Coupling apparatus
60; 160 Coupling means
61 Carrier
62; 162 Pawl
62a; 162a First bearing pin
63; 163 Spring
64; 164 Coupling link
66; 166 Pin
180 Second bearing pin
90 Bowden cable apparatus
92 First Bowden cable
94 Second Bowden cable
96 Operating lever
133 Pinion
135 Adapter
165 Toothing system
I First rotary joint
II Second rotary joint
III Third rotary joint
IV Fourth rotary joint
L Backrest pivot axis
S Spindle axis
x Longitudinal direction
y Transverse direction
z Vertical direction

What is claimed:

1. A vehicle seat, comprising:
   a) a seat part,
   b) a backrest,
   c) a kinematics system for transferring the vehicle seat from a use position, suitable for passenger transport, into an entry position and back,
   d) a drive apparatus for driving the kinematics system, wherein the drive apparatus selectively rotates both a coupling link, that is driven by a spindle nut, and a pawl, and
   e) a coupling apparatus for coupling the drive apparatus to the kinematics system, the coupling apparatus having the pawl and a counter-element comprising a pin,
   it being possible for the pawl and the counter-element to be locked to one another in order to couple the drive apparatus to the kinematics system, and it being possible for the pawl to be released from the counter-element by an actuation of the coupling apparatus, as a result of which the drive apparatus can be decoupled from the kinematics system,
   wherein the pawl is configured as a bracing pawl, it being possible for the pawl and the counter-element to be locked to one another beyond the self-locking action.

2. The vehicle seat as claimed in claim 1, wherein the counter-element can be locked exclusively to the pawl.

3. The vehicle seat as claimed in claim 1, wherein a force accumulator comprising a spring, preloads the pawl in the direction of a position which locks it to the counter-element.

4. The vehicle seat as claimed in claim 1, wherein the coupling apparatus can be actuated by the application of an actuating force to the backrest of the vehicle seat.

5. The vehicle seat as claimed in claim 3, wherein the pawl can be loaded via the counter-element with an opening torque by the application of the actuating force to the vehicle seat, wherein the pawl is released from the counter-element, by the opening torque being greater than a closing torque which is exerted on the pawl by way of the force accumulator.

6. The vehicle seat as claimed in claim 1, wherein the drive apparatus comprising an electric motor and a gear mechanism.

7. The vehicle seat as claimed in claim 1, wherein the coupling link is pivotally connected to the spindle nut, the spindle nut interacting with a spindle of the drive apparatus.

8. The vehicle seat as claimed in claim 1, wherein the coupling link has a toothing system which interacts with a pinion of the drive apparatus.

9. The vehicle seat as claimed in claim 1, wherein the pawl is articulated on one of the coupling device and the coupling link, and the counter-element is fastened to the other coupling device and the coupling link.

10. The vehicle seat as claimed in claim 9, wherein the pawl is articulated pivotably on a carrier of the coupling device.

11. The vehicle seat as claimed in claim 1, wherein the coupling device and the coupling link are mounted pivotably about a common pivot axis.

12. The vehicle seat as claimed in claim 11, wherein the common pivot axis of the coupling device and of the coupling link are aligned with a rotational axis of a rotary joint of the kinematics system.

13. The vehicle seat as claimed in claim 12, wherein the kinematics system has a motion link, wherein the motion link is pivoted by the rotary joint (I) about the common pivot axis of the coupling device and of the coupling link.

* * * * *